United States Patent
Ahlström et al.

(10) Patent No.: US 10,334,483 B2
(45) Date of Patent: Jun. 25, 2019

(54) SERVING GW TRIGGERED RELOCATION

(75) Inventors: Folke Ahlström, Västra Frölunda (SE); Lasse Olsson, Stenungssund (SE); Peter Ramle, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 373 days.

(21) Appl. No.: 13/508,736

(22) PCT Filed: Nov. 11, 2010

(86) PCT No.: PCT/EP2010/067283
§ 371 (c)(1),
(2), (4) Date: May 9, 2012

(87) PCT Pub. No.: WO2011/058096
PCT Pub. Date: May 19, 2011

(65) Prior Publication Data
US 2012/0230289 A1      Sep. 13, 2012

Related U.S. Application Data

(60) Provisional application No. 61/260,048, filed on Nov. 11, 2009.

(51) Int. Cl.
*H04W 4/00* (2018.01)
*H04W 36/00* (2009.01)
*H04W 36/12* (2009.01)

(52) U.S. Cl.
CPC ........ *H04W 36/0011* (2013.01); *H04W 36/12* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 5,752,162 A | * | 5/1998 | Sawyer | H04B 7/18556 455/13.1 |
| 2002/0001290 A1 | * | 1/2002 | Bender et al. | 370/328 |

(Continued)

FOREIGN PATENT DOCUMENTS

| | | |
|---|---|---|
| EP | 1013114 B1 | 5/2004 |
| EP | 2190222 A1 | 5/2010 |

(Continued)

OTHER PUBLICATIONS

Balbás et al., Policy and Charging Control in the Evolved Packet System, Feb. 2009, IEEE Communications Magazine (vol. 47 Issue:2), pp. 68-74.*

(Continued)

*Primary Examiner* — Hanh N Nguyen
*Assistant Examiner* — Jose L Perez
(74) *Attorney, Agent, or Firm* — Rothwell, Figg, Ernst & Manbeck, P.C.

(57) ABSTRACT

The present solution relates to a method in a source serving gateway (207a) for triggering relocation of at least one user equipment bearer resource from the source serving gateway (207a) to at least one target serving gateway (207b) in a communication network (200). The source serving gateway (207a) serves the user equipment (203) by providing bearer resources to the user equipment (203). The source serving gateway (207a) detects (501) an event indicating relocation of the at least one user equipment bearer resource from the source serving gateway (207a) to the at least one target serving gateway (207b). Furthermore, the source serving gateway (207a) sends (502) a message to a mobility management node (205, 209). The message comprises a trigger to relocate the at least one user equipment bearer resource from the source serving gateway (207a) to the at least one target serving gateway (207b).

10 Claims, 11 Drawing Sheets

(56) References Cited

U.S. PATENT DOCUMENTS

| | | | |
|---|---|---|---|
| 2005/0282554 A1* | 12/2005 | Shyy et al. | 455/450 |
| 2008/0188228 A1* | 8/2008 | Pecen et al. | 455/449 |
| 2008/0259873 A1 | 10/2008 | Ahmavaara et al. | |
| 2009/0109922 A1* | 4/2009 | Livanos | H04L 47/14 370/331 |
| 2009/0116385 A1* | 5/2009 | Ueda | 370/230 |
| 2009/0176496 A1* | 7/2009 | Li | H04L 47/767 455/437 |
| 2010/0272115 A1* | 10/2010 | Rannankutty | H04W 76/22 370/401 |
| 2010/0281157 A1* | 11/2010 | Rannankutty | H04W 24/08 709/224 |
| 2010/0284333 A1* | 11/2010 | Shirota | H04W 36/0022 370/328 |
| 2010/0299419 A1* | 11/2010 | Ramankutty | H04W 24/02 709/221 |

FOREIGN PATENT DOCUMENTS

| | | |
|---|---|---|
| JP | 2003521819 A | 7/2003 |
| WO | 2009/024082 A1 | 2/2009 |

OTHER PUBLICATIONS

Ekstrom, QoS Control in the 3GPP Evolved Packet System, Feb. 2009, IEEE Communications Magazine (vol. 47 Issue:2), pp. 76-83.*

Federal Standard 1037C, capacity, Telecommunications: Glossary of Telecommunication Terms at www.its.bldrdoc.gov/fs-1037/dir-006/_0843.htm, Aug. 23 1996, whole document (Year: 1996).*

Federal Standard 1037C, channel capacity, Telecommunications: Glossary of Telecommunication Terms at www.its.bldrdoc.gov/fs-1037/dir-007/_0920.htm, Aug. 23 1996, whole document (Year: 1996).*

Federal Standard 1037C, traffic capacity, Telecommunications: Glossary of Telecommunication Terms at www.its.bldrdoc.gov/fs-1037/dir-037/_5526.htm, Aug. 23 1996, whole document (Year: 1996).*

GSM, 3GPP, 3rd Generation Partnership Project; Technical Specification Group Services and System Aspects; General Packet Radio Service (GPRS) enhancements for Evolved Universal Terrestrial Radio Access Network (E-UTRAN) access (Release 8), Mar. 2008, pp. 18-20 (Year: 2008).*

3GPP TR 23.882, "3rd Generation Partnership Project; Technical Specification Group Services and System Aspects; 3GPP System Architecture Evolution: Report on Technical Options and Conclusions (Release 7)", 3GPP Standard; 3GPP TR 23.882, 3rd Generation Partnership Project (3GPP), Mobile Competence Centre; 659, Route Des Lucioles; F-06921 Sophia-Antipolis Cedex; France, No. V1.11.0, Jul. 1, 2007, pp. 1-211, XP050364123.

Office Action dated Jul. 25, 2014, issued in Mexican Patent Application No. MX/a/2012/005073, 4 pages.

Indian Examination Report dated Feb. 13, 2019, issued in Indian Patent Application No. 1396/KOLNP/2012, along with English translation, 6 pages.

* cited by examiner

SERVING GW TRIGGERED RELOCATION

CROSS REFERENCE TO RELATED APPLICATION(S)

This application is a 35 U.S.C. § 371 National Phase Entry Application from PCT/EP2010/067283, filed Nov. 11, 2010, designating the United States, which claims priority to U.S. patent application Ser. No. 61/260,048, filed Nov. 11, 2009. The disclosure of each patent application identified above is incorporated herein in its entirety by reference.

TECHNICAL FIELD

This invention relates generally to a source serving gateway, a method in the source serving gateway, a mobility management node and a method in the mobility management node. More particularly this invention relates to relocation of at least one user equipment bearer resource from the source serving gateway to at least one target serving gateway in a communication network.

BACKGROUND

A Serving GateWay (serving GW) is a network node in an Evolved Packet System (EPS) network which tunnels user plane data between a Packet Data Network GateWay (PDN GW) and a base station, i.e. eNodeB (eNB).

If the upper load limit in a serving GW is reached or an operator wants to move a specific subscriber, i.e. user equipment, away from a serving GW, e.g. due to monitoring reasons, then there are no suitable ways to perform that.

Another scenario might be the case when for any reason the operator wants to empty the serving GW from subscribers, i.e. user equipments, in a smooth manor, e.g. at upgrade/update of for instance the serving GW.

Figure 1:
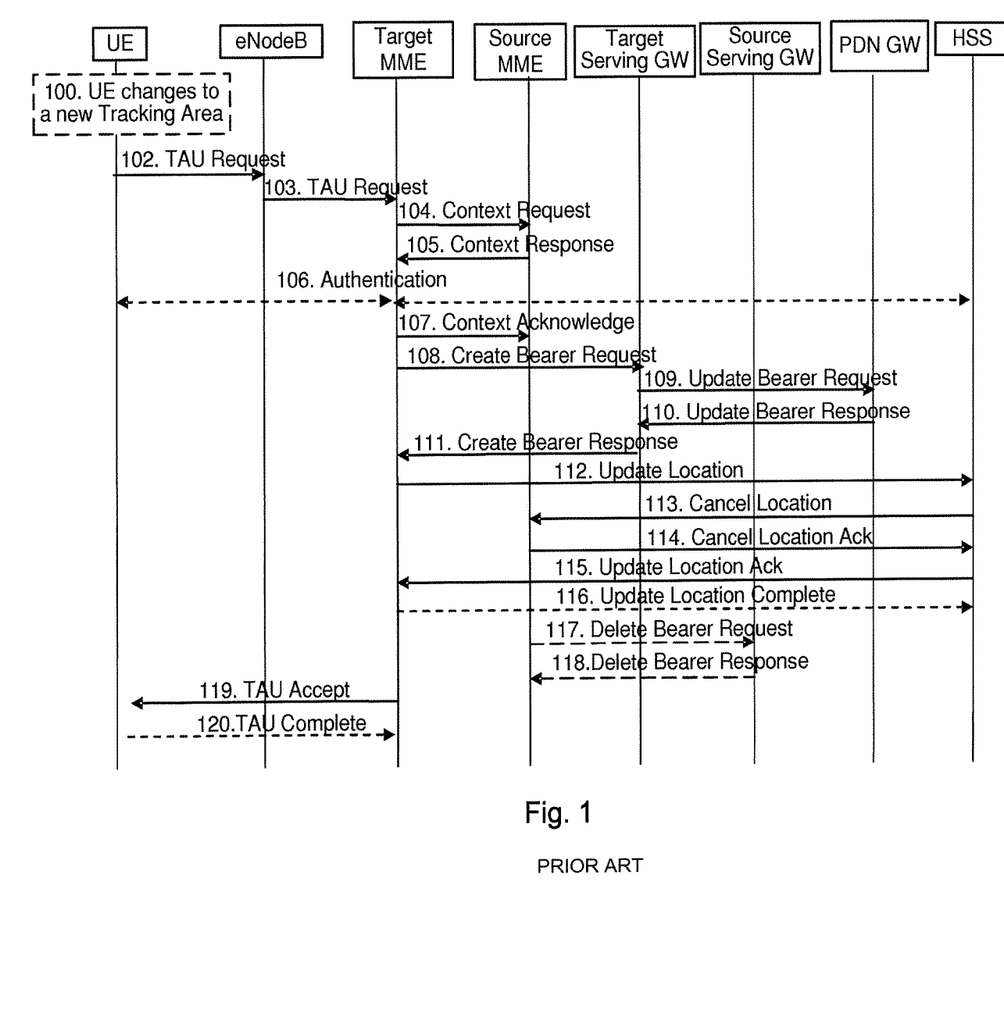
FIG. 1 is a combined flowchart and signaling diagram illustrating a TAU procedure with MME and serving GW change.

A Tracking Area Update (TAU) procedure is performed when a User Equipment (UE) moves outside its Tracking Area (TA) list, i.e. the user equipment detects a change to a new tracking area by discovering that its current TA is not in the list of TAs that the user equipment registered with a Mobility Management Entity (MME). FIG. 1 shows the Tracking Area Update procedure with MME and serving GW change. The steps 108-111 and 117-118 are related to creating, updating and deleting bearer requests, and will be described in detail. The remaining steps will not be described. However a person skilled in the art will understand how they are performed.

Step 108

A target MME sends a create bearer requests to a target serving GW. The target MME determines whether to relocate the serving GW or not. The serving GW is relocated when the source serving GW cannot continue to serve the UE. The target MME may also decide to relocate the serving GW in case a target serving GW is expected to serve the UE longer and/or with a more optimal UE to PDN GW path, or in case a target serving GW and, in some cases, the source serving GW, may be co-located with the PDN GW. If the target MME selected a target serving GW it sends a Create Bearer Request message, comprising e.g. International Mobile Subscriber Identity (IMSI), bearer contexts, to the selected target serving GW. The PDN GW address is indicated in the bearer contexts. The case of selecting one target serving GW is described here, however several target serving GWs may be selected.

Step 109

The target serving GW sends the message Update Bearer Request, comprising e.g. serving GW Address, serving GW Tunnel Endpoint Identifier (TEID), to the PDN GW concerned.

Step 110

The PDN GW updates its bearer contexts and returns an Update Bearer Response message, comprising e.g. PDN GW address and TEID(s), to the target serving GW.

Step 111

The serving GW returns a Create Bearer Response message, comprising e.g. serving GW address and TEID for user plane, serving GW Context ID, to the target MME.

The serving GW updates its bearer context. This allows the serving GW to route Bearer Protocol Data Units (PDUs) to the PDN GW when received from eNodeB.

Step 117

The source MME deletes/frees the EPS bearer resources by sending Delete Bearer Request messages, comprising e.g. TEID, to the source serving GW. The EPS bearer resources may in some cases also be called user equipment bearer resources. It indicates to the source serving GW that the source serving GW shall not initiate a delete procedure towards the PDN GW. If the serving GW has not changed, the serving GW does not delete/free the bearers. If the MME has not changed, step 111 triggers the release of EPS bearer resources, step 117, when a target serving GW is allocated.

As known for a person skilled in the art, an EPS bearer provides PDN connectivity service to a user equipment via EPS access, i.e. it is a "virtual" connection between for example the user equipment and a PDN GW in an Evolved Packet System. An EPS bearer provides a "bearer service", i.e. a transport service with specific Quality of Service (QoS) parameters. All traffic through an EPS bearer has to use the same set of QoS parameters.

Step 118

The serving GW acknowledges by sending a Delete Bearer Response message, comprising e.g. TEID, to the source MME The above described tracking area update procedure changes from a source serving GW to a target serving GW, and from a source MME to a target MME when the user equipment changes to a new tracking area.

If the upper load limit in a serving GW is reached or an operator wants to move a specific subscriber, i.e. user equipment, away from a serving GW, then there are no possible ways to perform that.

Another scenario might also be the case when for any reason the operator wants to empty the serving GW from subscribers in a smooth manor, i.e. upgrade/update.

A problem today is that the serving GW node has no means to initiate this move of subscribers which in turn may cause massive rejections during Bearer Setup Procedures, risk of overloading, or causing even worse problems.

SUMMARY

The objective problem is therefore to provide a mechanism for improving traffic handling in a communication system.

According to a first aspect of the invention, the objective problem is solved by a method in a source serving gateway for triggering relocation of at least one user equipment bearer resource from the source serving gateway to at least one target serving gateway in a communication network. The source serving gateway serves the user equipment by providing bearer resources to the user equipment. The source serving gateway detects an event indicating relocation of the at least one user equipment bearer resource from the source serving gateway to the at least one target serving gateway, and sends a message to a mobility management node. The message comprises a trigger to relocate the at least one user equipment bearer resource from the source serving gateway to the at least one target serving gateway.

According to a second aspect of the invention, the objective problem is solved by a method in a mobility management node for relocating at least one user equipment bearer resource from a source serving gateway to at least one target serving gateway in a communication network. The source serving gateway serves the user equipment by providing bearer resources to the user equipment. The mobility management node receives a message comprising a trigger to move the at least one user equipment bearer resource from the source serving gateway to the at least one target serving gateway, and selects the at least one target serving gateway. The mobility management node sends a message to the at least one selected target serving gateway requesting relocation of the at least one user equipment bearer resource to the at least one target serving gateway, and relocates the at least one user equipment bearer resource from the source serving gateway to the at least one selected target serving gateway.

According to a third aspect of the invention, the objective problem is solved by a source serving gateway for triggering relocation of at least one user equipment bearer resource from the source serving gateway to at least one target serving gateway in a communication network. The source serving gateway serves the user equipment by providing bearer resources to the user equipment. The source serving gateway comprises a detecting unit which is configured to detect an event indicating relocation of the at least one user equipment bearer resource from the source serving gateway to the at least one target serving gateway. The source serving gateway also comprises a sending unit which is configured to send a message to a mobility management node. The message comprises a trigger to relocate the at least one user equipment bearer resource from the source serving gateway to the at least one target serving gateway.

According to a fourth aspect of the invention, the objective problem is solved by a mobility management node for relocating at least one user equipment bearer resource from a source serving gateway to at least one target serving gateway in a communication network. The source serving gateway serves the user equipment by providing bearer resources to the user equipment. The mobility management node comprises a receiving unit configured to receive a message comprising a trigger to move the at least one user equipment bearer resource from the source serving gateway to the at least one target serving gateway, and a selecting unit configured to select the at least one target serving gateway. Further, the mobility management node comprises a sending unit which is configured to send a message to the selected at least one target serving gateway requesting relocation of the at least one user equipment bearer resource to the at least one target serving gateway. Additionally, the mobility management node comprises a relocating unit configured to relocate the at least one user equipment bearer resource from the source serving gateway to the selected at least one target serving gateway.

Since the source serving gateway is enabled to initiate a relocation of user equipment bearer resource(s), due to overload, based on capacity or a need of emptying the source serving gateway, the traffic handling in the communication system is improved.

The present technology affords many advantages, for which a non-exhaustive list of examples follows:

An advantage of the present solution is that there is a possibility for the serving GW to be off loaded in crisis situations. Another advantage is the capacity parameter introduction regarding the serving GWs which may control the load. Another advantage is that advanced OverLoad Protection (OLP) in serving GW saves time in EPS Bearer establishment scenarios. The present solution provides the possibility for the operator to move one subscriber, i.e. user equipment, into wanted equipment. The present solution also provides the possibility for the operator to take one serving GW out of commission, i.e. update or upgrade, without any In Service Provider (ISP) loss.

The present invention is not limited to the features and advantages mentioned above. A person skilled in the art will recognize additional features and advantages upon reading the following detailed description.

BRIEF DESCRIPTION OF THE DRAWINGS

The invention will now be further described in more detail in the following detailed description by reference to the appended drawings illustrating embodiments of the present solution and in which.

DETAILED DESCRIPTION

The present solution enables the serving GW to move a user equipment, i.e. user equipment bearer resources, from a source serving GW to at least one target serving GW. This is useful in case the upper load limit in the serving GW is reached, or if an operator wants to move a specific subscriber away from a serving GW e.g. in case of maintenance.

The present solution is at least four fold:

1) The serving GW may have the option to initiate a move on a specific subscriber using e.g. IMSI, i.e. operator controlled.

2) The serving GW may have the option to initiate a move on a specific subscriber using overload protection.

3) The serving GW may have the option to initiate a total emptying of the own node, i.e. operator controlled.

4) The Serving General Packet Radio Service (GPRS) Support Node (SGSN)/MME or the Domain Name Server (DNS) may host a capacity table for each group of serving GWs. When this is set to 0, either by the operator or by the serving GW depending on implementation and situation, no more UE bearer resources may be allocated in that Serving GW.

Figure 2:
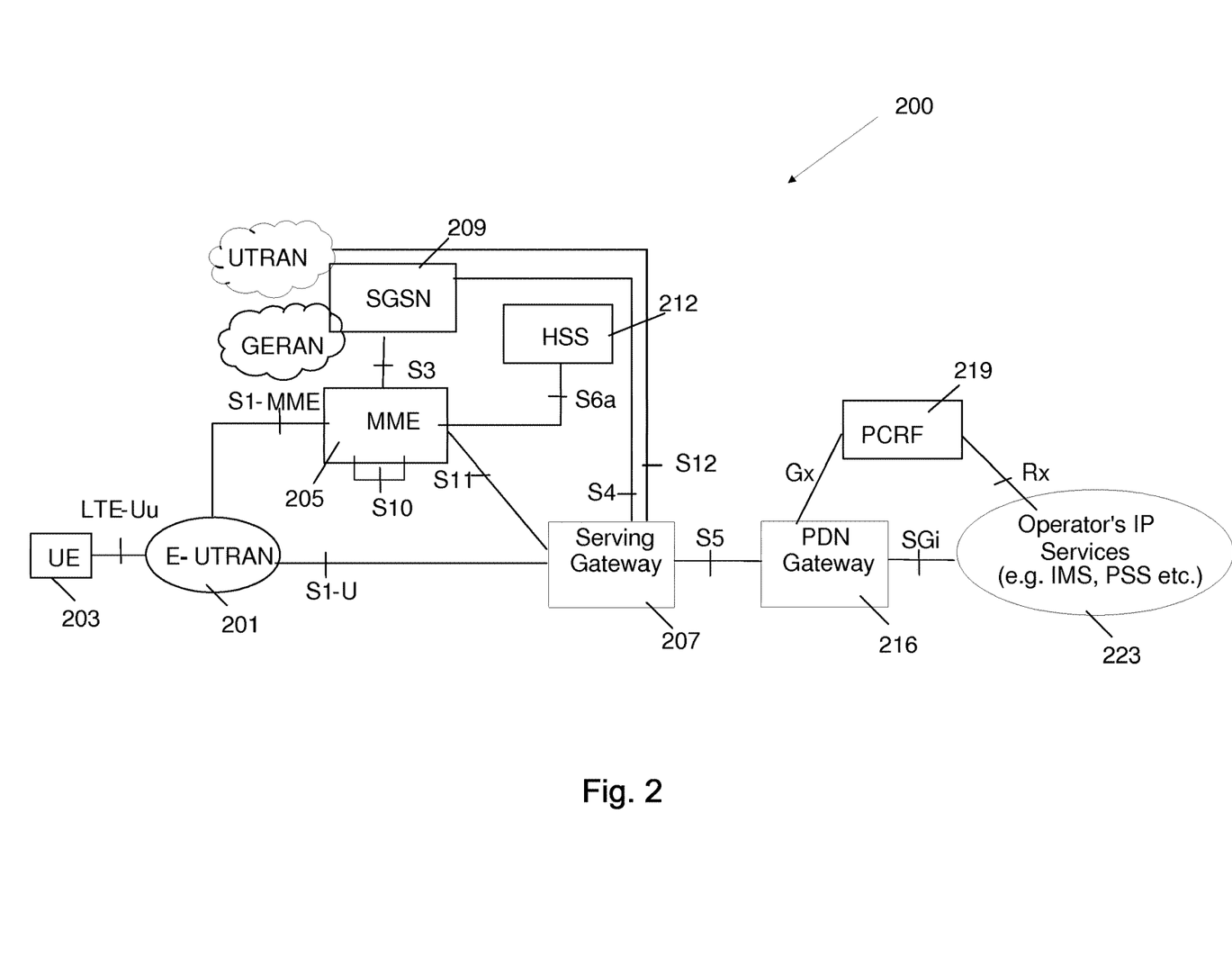
FIG. 2 is a block diagram illustrating embodiments of the architecture of an Evolved Packet System.

FIG. 2 is a block diagram illustrating example embodiments of the architecture of a communication network 200, such as an EPS, showing nodes such as e.g. the SGSN and MME. The architecture comprises Evolved-Universal Mobile Telecommunications System (UMTS) Terrestrial Radio Access Network (E-UTRAN) on the access side and Evolved Packet Core (EPC) on the core side.

An E-UTRAN 201 comprises base station(s) (not shown), such as e.g. eNodeB(s), which interfaces with a user equipment 203 by means of the Long Term Evolution (LTE)-Uu interface. eNodeBs of the E-UTRAN 201 are connected by the S1 interface to the EPC. Even though FIG. 2 shows only one user equipment 203, the person skilled in the art will understand that even more than one user equipments 203 may be part of the communication network 200.

The E-UTRAN 201 is connected to a MME 205 by means of the S1-MME interface. The MME 205 takes care of signaling to and from the user equipment 203, it manages and stores UE context, it is involved in the bearer activation/deactivation process etc.

As mentioned earlier, a Serving Gateway 207 routes and forwards user data packets. In other words, the serving gateway 207 serves the user equipment 203 by providing bearer resources to the user equipment 203. S1-U is the interface between the serving GW 207 and E-UTRAN 201, and S11 is the interface between the serving GW 207 and the MME 205.

A SGSN 209 is responsible for the delivery of data packets to and from the user equipment(s) 203 within its geographical service area and performs security functions and access control. It is connected to the MME 205 via the S3 interface. In some cases, the MME 205 and the SGSN 209 may be combined in one entity.

A Home Subscriber Server (HSS) 212 is a database comprising subscription data and authentication data. The MME 205 is connected to the HSS 212 via the S6a interface.

The serving GW 207 is connected to a PDN Gateway 216 via an S5 interface. The PDN Gateway 216 is the unit that allocates and reserves IP addresses to user equipment(s) 203 currently registered to the network 200. The PDN Gateway 216 also takes care of policy and charging enforcement, and receives the policies from a Policy Control and Charging Rules Function (PCRF) 219.

The SGi reference point is the interface between the PDN Gateway 216 and the packet data network providing operator IP Services 223 such as IP Multimedia Subsystem (IMS), Packet Switched Streaming (PSS) etc.

Figure 3:
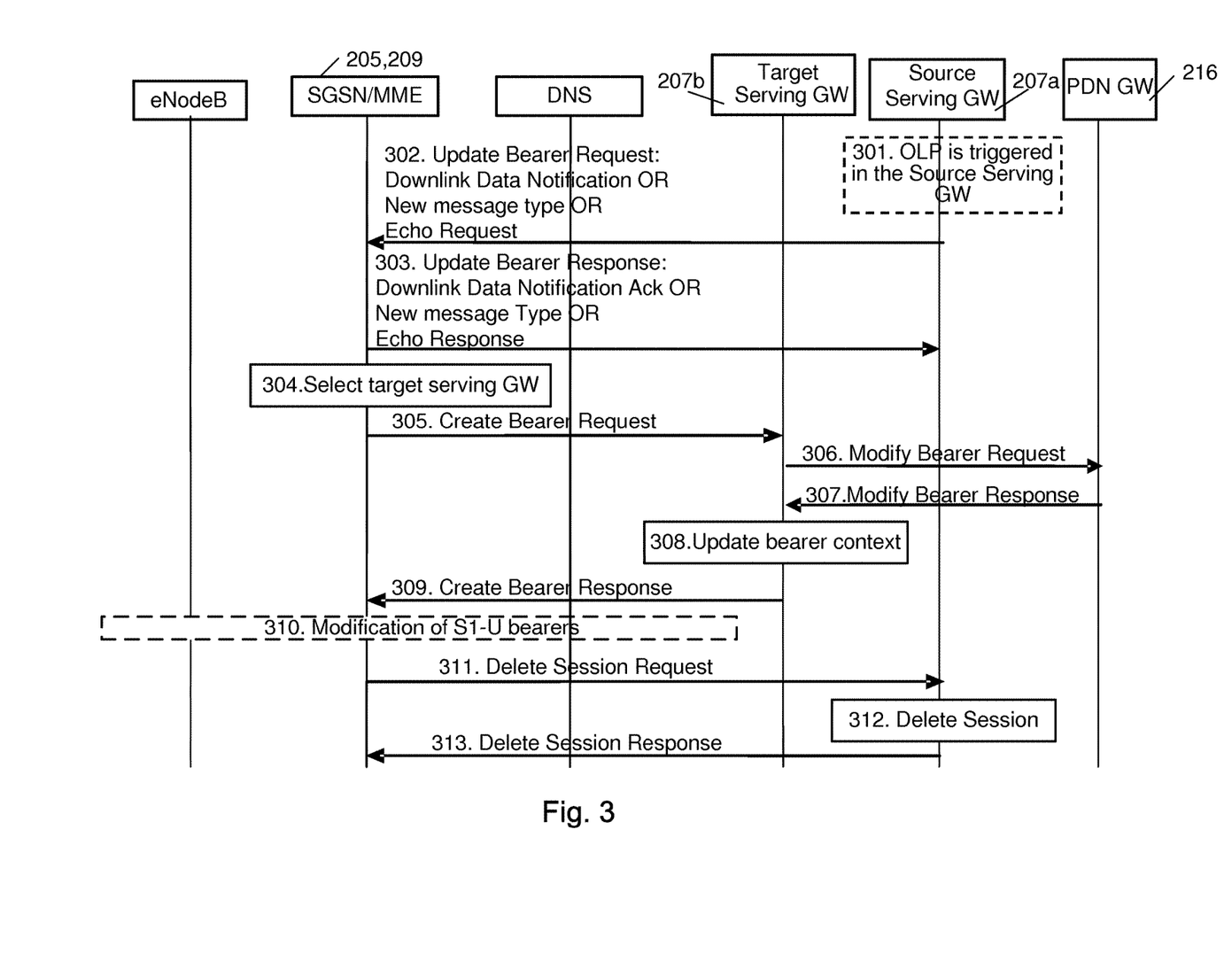
FIG. 3 is a combined flowchart and signaling diagram illustrating a serving GW triggered move procedure.

FIG. 3 is a combined flowchart and signaling diagram illustrating an exemplary embodiment of a procedure for serving GW triggered relocation. The procedure may take place in a SGSN/MME-Serving GW environment as described above in relation to FIG. 2. FIG. 3 shows a source serving GW 207a and target serving GW 207b. Even though FIG. 3 shows one target serving GW 207b, a person skilled in the art will understand that more than one target serving GW 207b is also possible. One or more user equipment bearer resources (not shown) are to be moved or relocated from the source serving GW 207a to the at least one target serving GW 207b. The source serving GW 207a may also be referred to as the old serving GW, and the target serving GW 207b may be referred to as the new serving GW. FIG. 3 shows the SGSN 205 and MME 209 as one entity, as described earlier. A DNS provides a list of possible target serving GWs 207b to relocate the user equipment bearer resources to.

The procedure comprises the following steps, which steps may be performed in any suitable order as understood by a person skilled in the art:

Step 301
The overload protection function is triggered in the source serving GW 207a because the source serving GW 207a is overloaded. Another alternative is that the overload protection function is triggered by the operator.

Step 302
The source serving GW 207a sends a message to the SGSN/MME 205,209 including the IMSI. This may be solved by using e.g.:
Update Bearer Request using the same QoS as a previously negotiated QoS and comprising a move trigger in a Private Extension Information Element (IE).
Downlink Data Notification using the Private Extension IE, same as above.
Echo Request.
Or new standardized procedures aimed at solving this scenario.

Step 303
The SGSN/MME 205,209 responds to the source serving GW 207a by sending e.g.:
Update Bearer Response using the same QoS as a previously negotiated QoS.
Downlink Data Notification Acknowledgement.
Echo Response.
Or new standardized procedures aimed at solving this scenario.

Step 304
The SGSN/MME 205,209 selects at least one target serving GW 207b. If a previous target serving GW selection has been performed, the selection is done from a list of serving GWs 207. The list of serving GWs 207 may be previously reported from an initial DNS query, if DNS was used for serving GW selection, or it may be comprised in the SGSN/MME 205,209. The DNS query may be performed during an attach procedure or during a Tracking Area Update (TAU) procedure. The list may be stored in a computer readable medium, i.e. a memory unit, in the DNS or SGSN/MME 205, 209. The SGSN/MME 205, 209 may also take a capacity value into consideration, i.e. signaling and payload capacity of the target serving GW 207b.

If no previous serving GW selection has been performed, the SGSN/MME 205,209 makes a serving GW selection. The EPS bearer may have been activated in this SGSN/MME 205,209 through Inter TAU/Routing Area Update (RAU) or another handover procedure.

Step 305
The SGSN/MME 205,209 constructs a user equipment context for the user equipment 203 and sends a Modify Bearer Request message, comprising e.g. IMSI, EPS bearer contexts to the at least one selected target serving GW 207b. A PDN GW 216 address is indicated in the bearer contexts. Since the same eNodeB (not shown) is used, the Internet Protocol (IP) addresses and TEIDs for user plane are comprised in the EPS Bearer context.

Step 306
The target serving GW 207b sends the message Modify Bearer Request, comprising e.g. target serving GW address, serving GW TEID, to the PDN GW 216 concerned.

Step 307
The PDN GW 216 updates its bearer contexts and returns a Modify Bearer Response message, comprising e.g. PDN GW address and TEID(s), to the target serving GW 207b.

Step 308
The target serving GW 207b updates its bearer context. This allows the target serving GW 207b to route bearer PDUs to the PDN GW 216 when received from the eNodeB.

Step 309

The target serving GW 207b returns a Modify Bearer Response message, comprising e.g. target serving GW address and TEID for user plane, serving GW context ID, to the SGSN/MME 205,209.

Step 310

The S1-U bearers are modified, i.e. the bearer resources are relocated from the serving GW 207a to the selected target serving GW 207b.

Step 311

The SGSN/MME 205,209 relocates the user equipment context, it frees/deletes the EPS bearer resources in a session towards the source serving GW 207a by sending Delete Session Request messages, comprising e.g. TEID, to the source Serving GW 207a. It indicates to the source serving GW 207a that the source serving GW 207a shall not initiate a delete procedure towards the PDN GW 216.

Step 312

The bearer resources in a session between the source serving GW 207a and PDN GW 216 are freed/deleted.

Step 313

The source serving GW 207a acknowledges the received delete/free session request by sending delete session response messages, comprising e.g. TEID, to the SGSN/MME 205,209.

The new addresses from the target serving GW are communicated, not shown, to the eNodeB either when the bearers are re-established or through a modification procedure. It may also be performed by a release/set-up procedure. If the latter is chosen, the new addresses may once again be communicated towards the target serving GW 207b. The eNodeB communication may be initiated after step 309 in FIG. 3.

Figure 4:
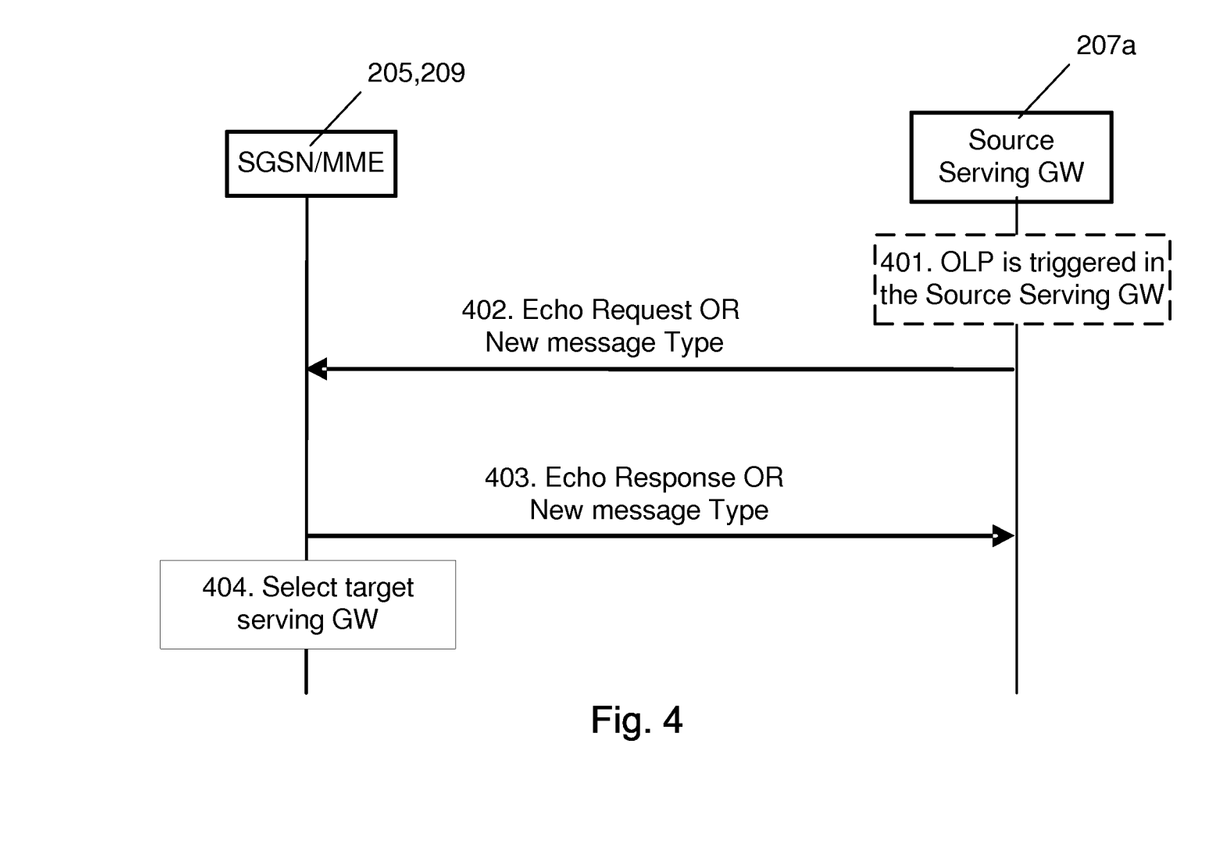
FIG. 4 is a combined flowchart and signaling diagram illustrating a serving GW triggered capacity change procedure.

FIG. 4 is a combined flowchart and signaling diagram illustrating a second exemplary embodiment of a procedure for serving GW triggered capacity change procedure. The SGSN/MME 205,209 or the DNS host a capacity table for each group of serving GWs returned from the DNS. The capacity table comprises a capacity parameter which may be related to control of the load of the serving GW. When this parameter is set to 0, either by the operator or by the serving GW 207 depending on the implementation and the situation, no more UE bearer resources may be allocated to that serving GW 207.

The procedure comprises the following steps, which steps may be performed in any suitable order as understood by a person skilled in the art:

Step 401

The overload protection function is triggered in the source serving GW 207a because the source serving GW 207a is overloaded. Another alternative is that the overload protection function is triggered by the operator.

Step 402

The source serving GW 207a sends a message to the SGSN/MME 205,209 comprising the new CAP value. This may be solved by using:

Echo Request and comprise a new CAP value in the IE Private Extension. If the CAP value is set to 0 then no further requests should be directed towards that Serving GW.

Or new standardized procedures aimed at solve this scenario.

Step 403

The SGSN/MME 205,209 responds to the source serving GW 207a using:

Echo Response.

Or new standardized procedures aimed at solve this scenario.

Step 404

The SGSN/MME 205,209 selects at least one target serving GW 207b by taking the new Capacity "CAP" value into consideration during relocation and establishment procedures.

The capacity value may either indicate request for a total stop of incoming signalling or a tuning capacity value to get a balanced set of serving GWs, i.e. to get a balanced load within the serving GW pool. A CAP=0 may exclude the source SGW 207a from being re-selected. CAP values for the target SGWs 207b are fetched in some other way. In other words, selection of target SGW may be based on previous CAP values received from potential target SGWs 207b. When the CAP value is larger than 0, it is possible to send user equipments to the SGW. How often user equipments are sent to the target SGW 207b depends on the CAP value and on the number of target SGWs 207b.

Steps corresponding to the steps 305-313 in FIG. 3 is also performed in FIG. 4, but they are not repeated here or shown in FIG. 4, for the sake of simplicity.

The method described above will now be described seen from the perspective of the source serving gateway 207a. FIG. 5a-d are flowcharts describing the present method in the source serving gateway 207a for triggering relocation of at least one user equipment bearer resource from the source serving gateway 207a to at least one target serving gateway 207b in a communication network 200. As mentioned above, the source serving gateway 207a serves the user equipment 203 by providing bearer resources to the user equipment 203. The method comprises the steps to be performed by the source serving gateway 207a, which steps may be performed in any suitable order as understood by the skilled person:

Step 501

Figure 5A:
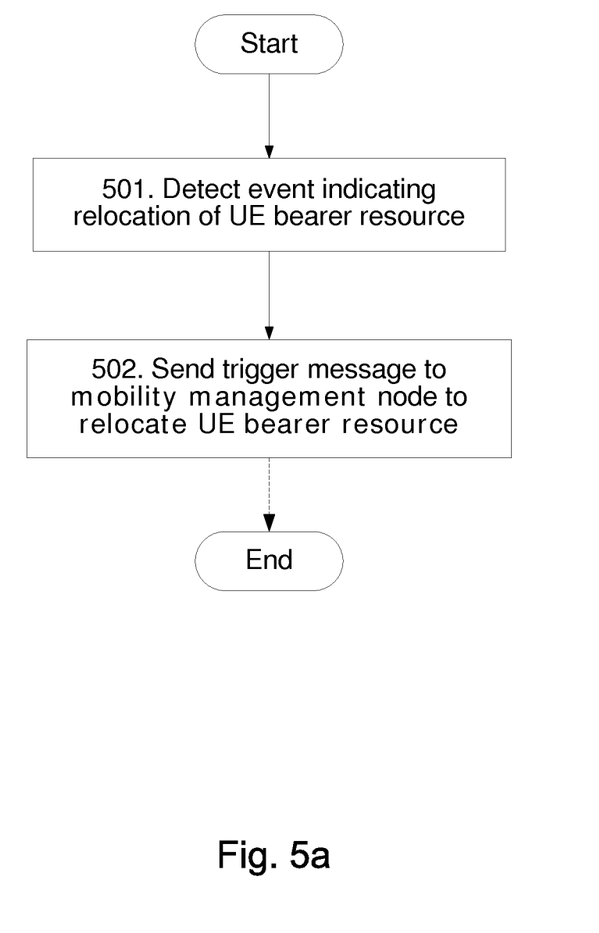
FIG. 5a-d are flow charts illustrating embodiments of a method in a source serving gateway.

This step corresponds to steps 301 and 401 in FIGS. 3 and 4. The source serving gateway 207a detects an event indicating relocation of the at least one user equipment bearer resource from the source serving gateway 207a to the at least one target serving gateway 207b.

Step 501a

This step corresponds to steps 301 and 401 in FIGS. 3 and 4. In some embodiments, this sub step of step 501 is performed. The source serving gateway 207a detects overload of the source serving gateway 207a. The overload may be detected by an overload protection function.

Step 501b

This step corresponds to step 301 in FIG. 3. In some embodiments, this sub step of step 501 is performed instead of or in addition to sub step 501a. The source serving gateway 207a receives a trigger from an operator 223 to relocate the at least one user equipment bearer resource from the source serving gateway 207a to the at least one target serving gateway 207b.

Step 502

This step corresponds to steps 302 and 402 in FIGS. 3 and 4. The source serving gateway 207a sends a message to a mobility management node 205, 209. The message comprises a trigger to relocate the at least one user equipment bearer resource from the source serving gateway 207a to the at least one target serving gateway 207b. The mobility management node 205, 209 may be a combined SGSN/MME node.

The trigger to relocate the at least one user equipment bearer resource from the source serving gateway 207a to the at least one target serving gateway 207b may be comprised in an information element in an update bearer response in a downlink data notification or in other alternative signals.

Step 503

Figure 5B:
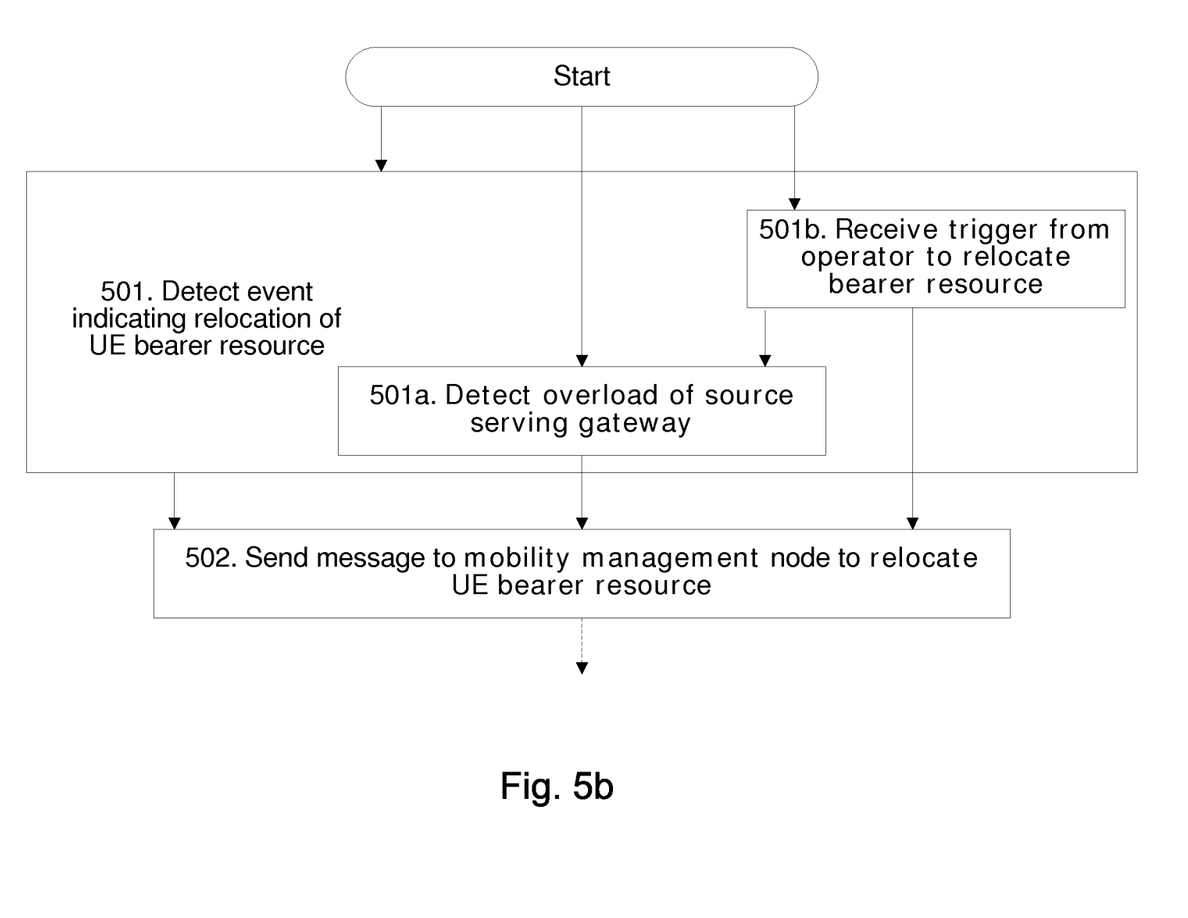

This step corresponds to step 303 in FIG. 3. In some embodiments, the source serving gateway 207a receives a response from the mobility management node 205,209 acknowledging the received message comprising the trigger to relocate to the at least one target serving gateway 207b.

Step 504

This step corresponds to step 311 in FIG. 3. In some embodiments, the source serving gateway 207a receives a request from the mobility management node 205,209. The request comprises instructions to free/delete the at least one user equipment bearer resource between the source serving gateway 207a and the user equipment 203.

Step 505

This step corresponds to step 312 in FIG. 3. In some embodiments, the source serving gateway 207a frees/deletes the at least one bearer resource between the source serving gateway 207a and the user equipment 203.

Step 506

This step corresponds to step 313 in FIG. 3. In some embodiments, the source serving gateway 207a sends an acknowledgement to the mobility management node 205, 209 that the at least one bearer resource is freed/deleted.

Step 507

Figure 5C:
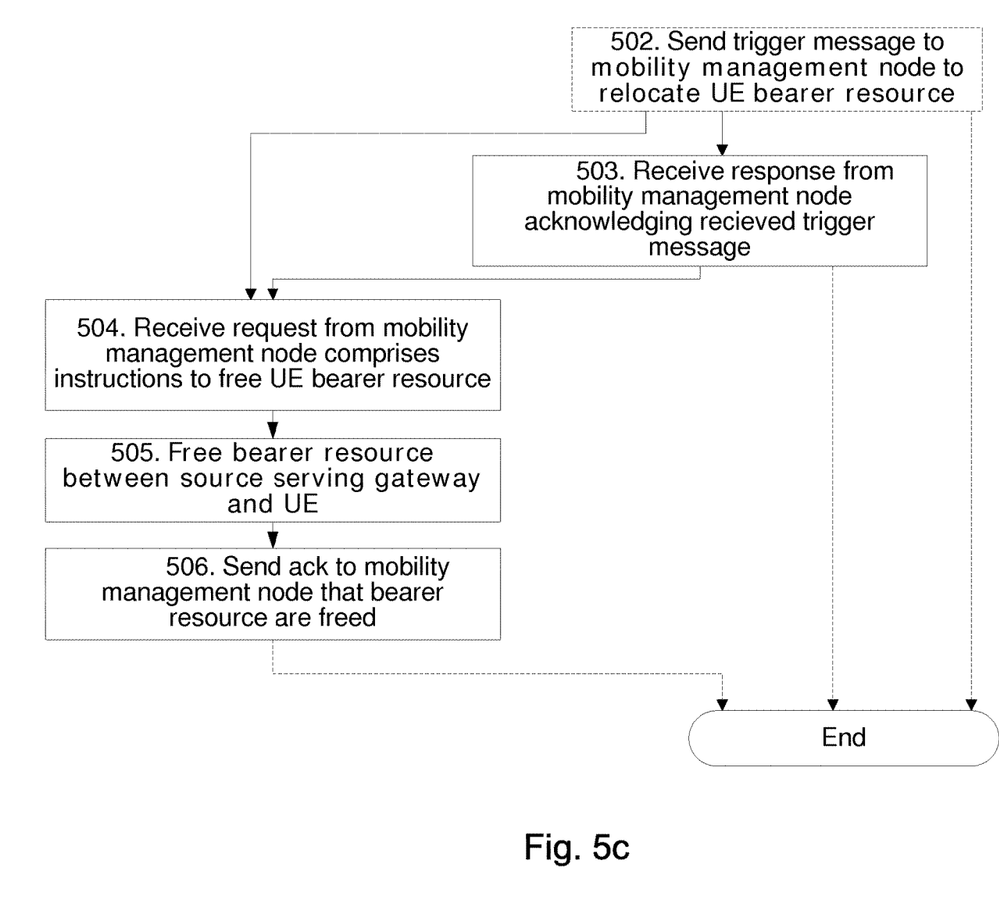

This step corresponds to steps 304, 404 in FIGS. 3 and 4. In some embodiments, the source serving gateway 207a receives a request for a capacity value of the source serving gateway 207a. The capacity value may indicate the signaling and bandwidth capacity of the source serving gateway 207a.

Step 508

This step corresponds to steps 304, 404 in FIGS. 3 and 4. In some embodiments, the source serving gateway 207a obtains a capacity value of the source serving gateway 207a. The capacity value indicates the capacity of the source serving gateway 207a, and comprises both the signaling and payload capacity of the source serving gateway 207a.

Step 509

Figure 5D:
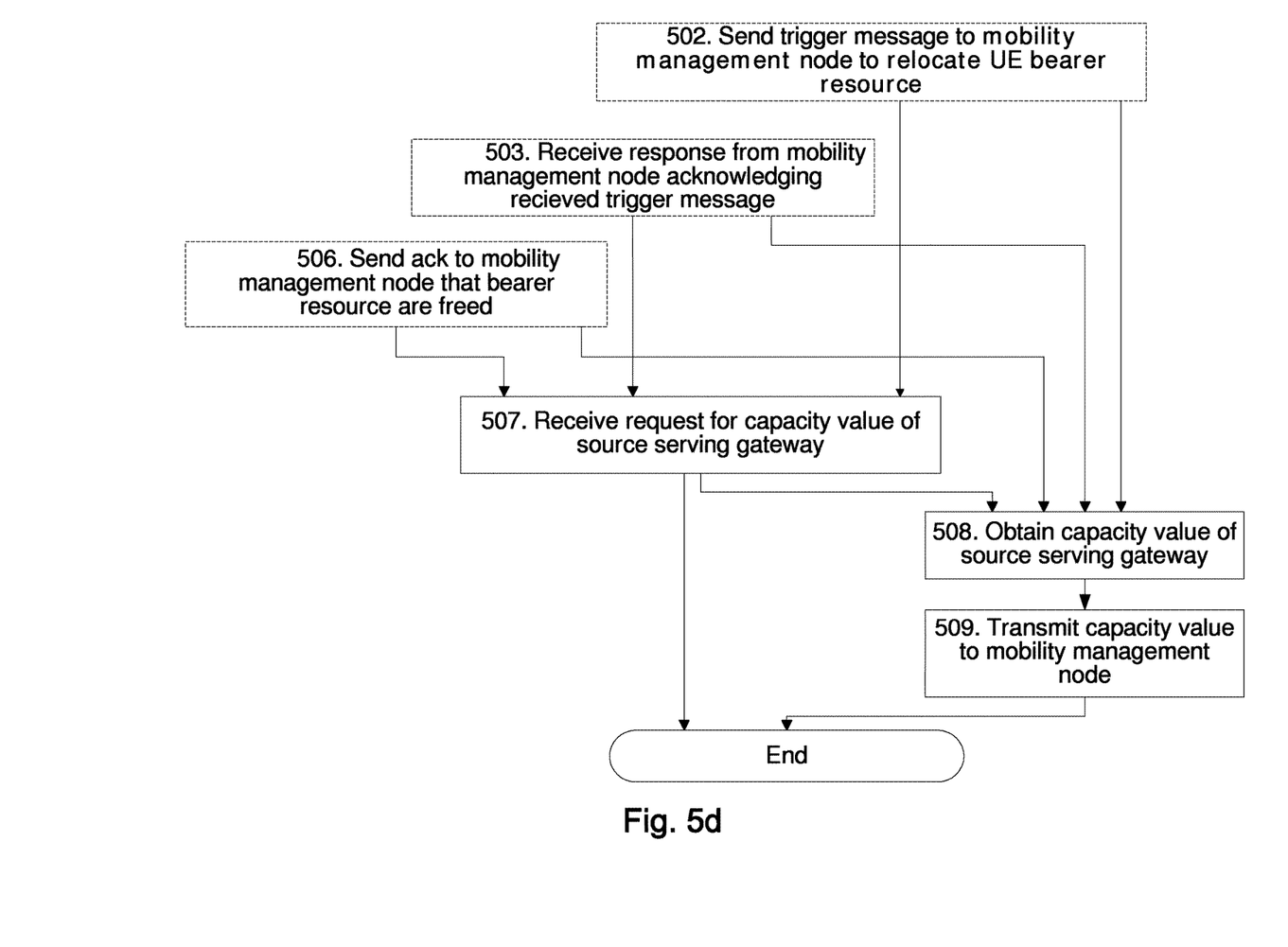

This step corresponds to steps 304, 404 in FIGS. 3 and 4. In some embodiments, the source serving gateway 207a transmits the capacity value to the mobility management node 205, 209.

Figure 6:
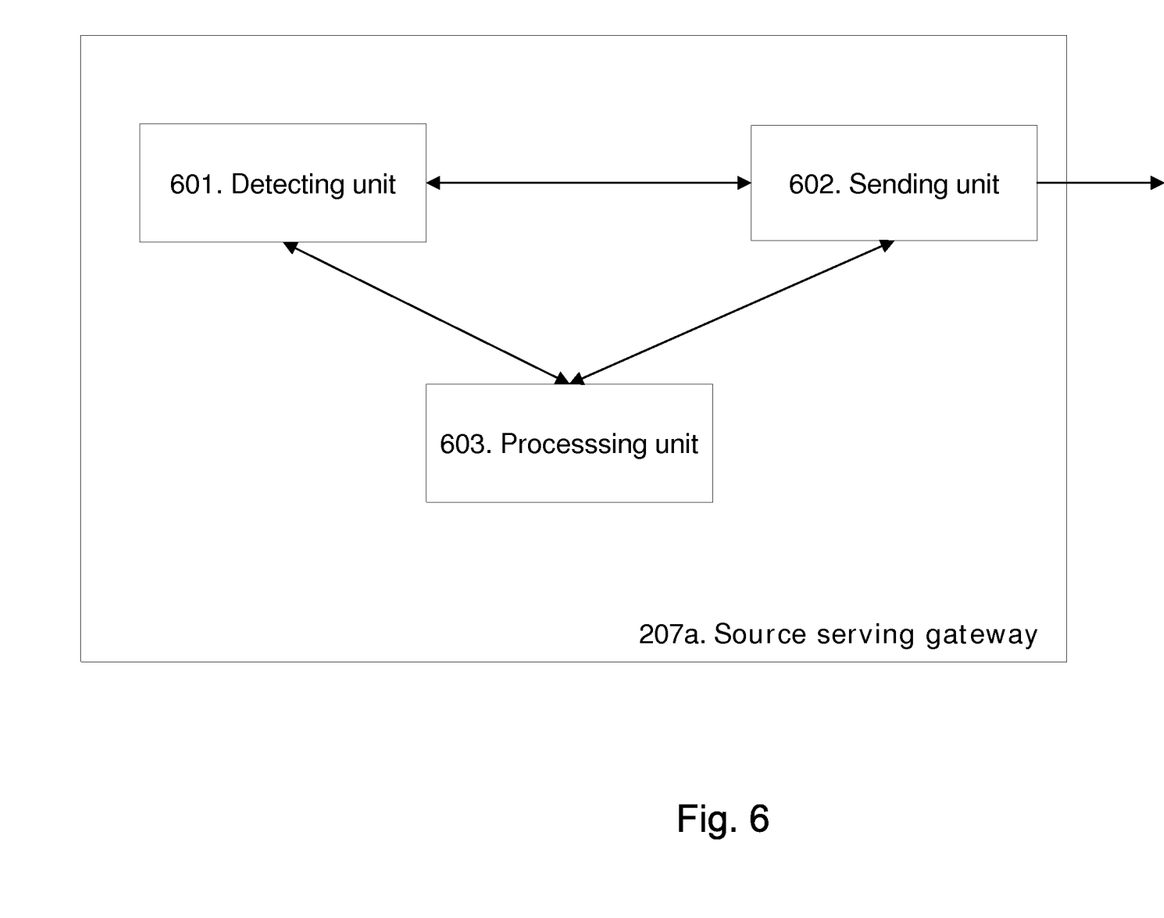
FIG. 6 is a block diagram illustrating embodiments of a source serving gateway.

To perform the method steps shown in FIG. 5 for triggering relocation of at least one user equipment bearer resource from the source serving gateway 207a to at least one target serving gateway 207b in a communication network 200 the source serving gateway 207a comprises a source serving gateway arrangement as shown in FIG. 6. The source serving gateway 207a serves the user equipment 203 by providing bearer resources to the user equipment 203. The source serving gateway 207a comprises a detecting unit 601 which is configured to detect an event indicating relocation of the at least one user equipment bearer resource from the source serving gateway 207a to the at least one target serving gateway 207b. Further, the source serving gateway 207a comprises a sending unit 602 which is configured to send a message to a mobility management node 205, 209. The message comprises a trigger to relocate the at least one user equipment bearer resource from the source serving gateway 207a to the at least one target serving gateway 207b. This enables relocation of the at least one user equipment bearer resource from the source serving gateway 207a to the at least one target serving gateway 207b.

Figure 7:
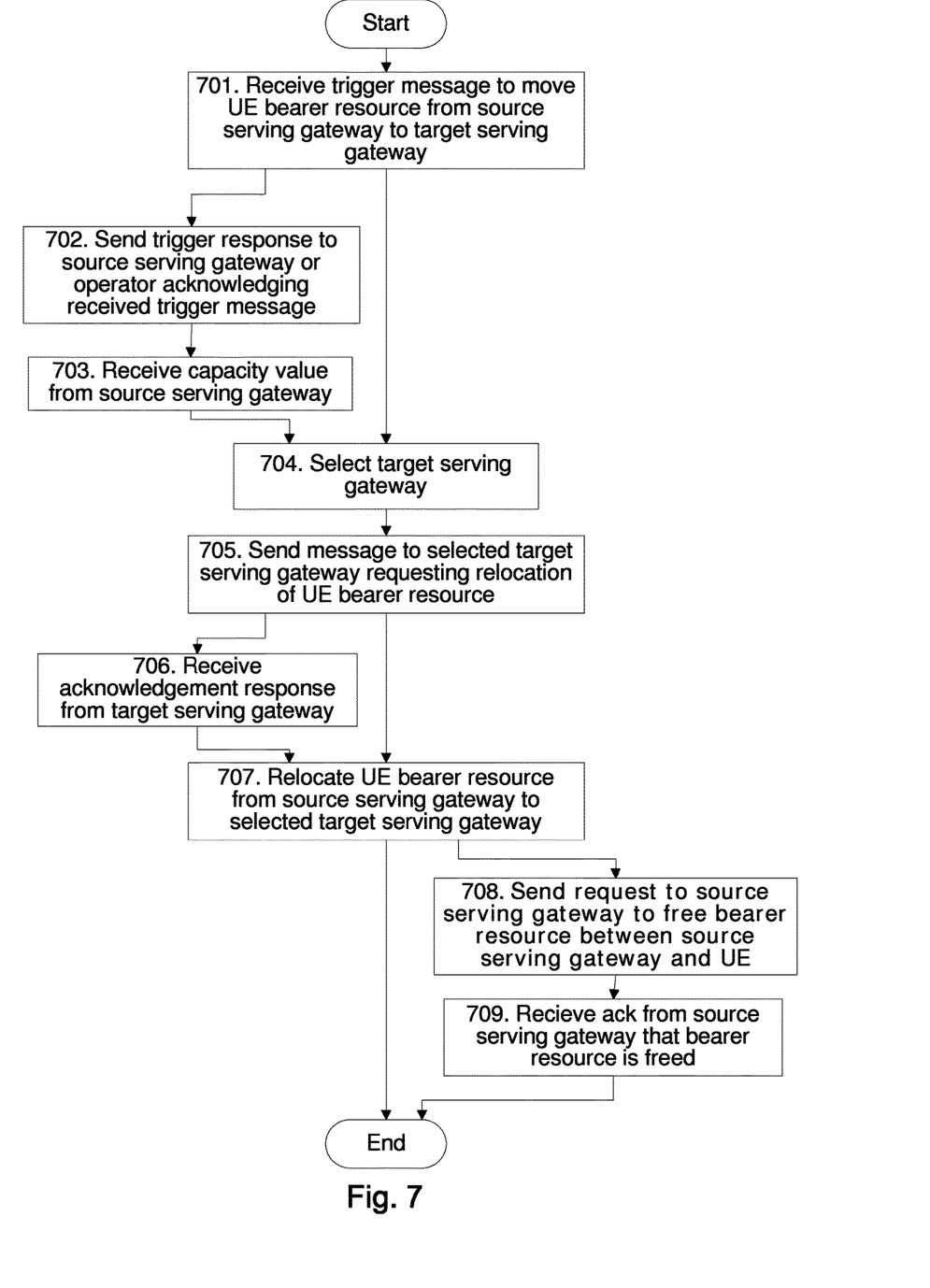
FIG. 7 is a flow chart illustrating embodiments of a method in a mobility management node.

The method described above will now be described seen from the perspective of the mobility management node 205,209. FIG. 7 is a flowchart describing the present method in the mobility management node 205, 209 for relocating at least one user equipment bearer resource from a source serving gateway 207a to at least one target serving gateway 207b in a communication network 200. As mentioned above, the source serving gateway 207a serves the user equipment 203 by providing bearer resources to the user equipment 203. The mobility management node 205, 209 may be a combined SGSN/MME node. The method comprises the steps to be performed by the mobility management node 205, 209, which steps may be performed in any suitable order as understood by the skilled person:

Step 701

This step corresponds to step 302 and 402 in FIGS. 3 and 4. The mobility management node 205, 209 receives a message comprising a trigger to move the at least one user equipment bearer resource from the source serving gateway 207a to the at least one target serving gateway 207b.

In some embodiments, the received message comprising a trigger is received from one of the source serving gateway 207a and an operator 223.

Step 702

This step corresponds to steps 303, 403 in FIGS. 3 and 4. In some embodiments, the mobility management node 205, 209 sends a response to one of the source serving gateway 207a and an operator 223 acknowledging the received message comprising the trigger to relocate to the at least one target serving gateway 207b.

Step 703

This step corresponds to step 304 in FIG. 3. In some embodiments, the mobility management node 205, 209 receives a capacity value from the source serving gateway 207a. The capacity value indicates the capacity of the source serving gateway 207a.

The SGSN/MME 205, 209 selects at least one target serving gateway 207b by taking the new Capacity "CAP" value into consideration during relocation and establishment procedures.

If CAP=0 it may exclude the source serving gateway 207a from being re-selected and stops incoming signalling to the source serving gateway 207a. If CAP>0, the source serving gateway 207a may receive traffic.

CAP values for the target serving gateways 207b may also be fetched. The selection of target serving gateway 207b may be based on previous CAP values received from potential target serving gateways 207b.

Step 704

This step corresponds to steps 304, 404 in FIGS. 3 and 4. The mobility management node 205,209 selects the at least one target serving gateway 207b.

In some embodiments, the selection of the at least one target serving gateway 207b is based on the received capacity value. If CAP=0, the source serving gateway 207a is not selected as target serving gateway 207b.

In some embodiments, the target serving gateway 207b is selected from a list of target serving gateway 207b comprised in the mobility management node 205,209 or a DNS. The list may be stored in a computer readable medium. The list may, in some embodiment, be specified via a command by the operator 223.

Step 705

This step corresponds to step 305 in FIG. 3. The mobility management node 205,209 sends a message to the at least one selected target serving gateway 207b requesting relocation of the at least one user equipment bearer resource to the at least one target serving gateway 207b.

In some embodiments, the message sent to the selected target serving gateway 207b requesting relocation of the at least one user equipment bearer resource to the at least one target serving gateway 207b is a create bearer request.

Step 706

This step corresponds to step 309 in FIG. 3. In some embodiments, the mobility management node 205, 209 receives a response from the at least one target serving gateway 207b acknowledging the received message requesting relocation of the at least one user equipment bearer resource to the at least one target serving gateway 207b.

Step 707

This step corresponds to step 310 in FIG. 3. The mobility management node 205,209 relocates the at least one user equipment bearer resource from the source serving gateway 207a to the at least one selected target serving gateway 207b.

Step 708

This step corresponds to step 311 in FIG. 3. In some embodiments, the mobility management node 205, 209 sends a request to the source serving gateway 207a. The request comprises instructions to free/delete the at least one bearer resource between the source serving gateway 207a and the user equipment 203.

Step 709

This step corresponds to step 313 in FIG. 3. In some embodiments, the mobility management node 205, 209 receives an acknowledgement from the source serving gateway 207a that the at least one bearer resource is freed.

Figure 8:
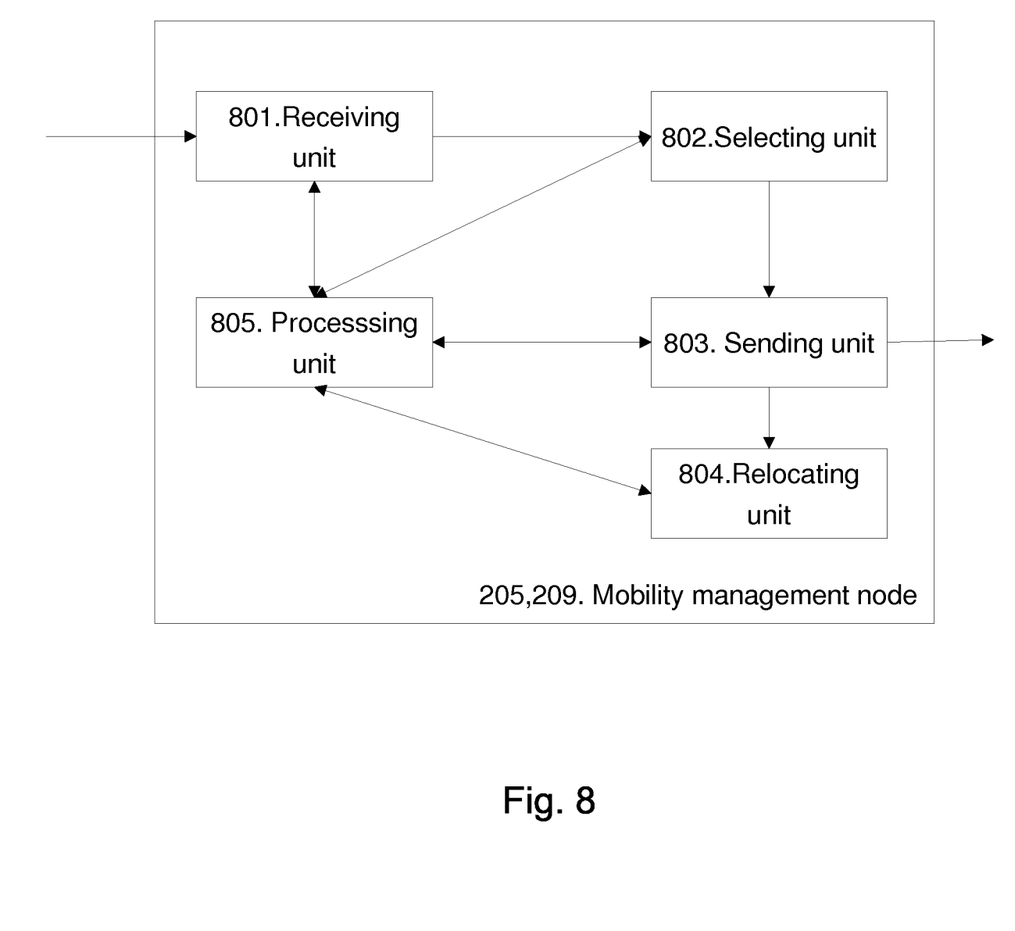
FIG. 8 is a block diagram illustrating embodiments of a mobility management node.

To perform the method steps shown in FIG. 7 for relocating at least one user equipment bearer resource from a source serving gateway 207a to at least one target serving gateway 207b in a communication network 200 the mobility management node 205, 209 comprises a mobility management node arrangement as shown in FIG. 8. As mentioned above, the source serving gateway 207a serves the user equipment 203 by providing bearer resources to the user equipment 203. The mobility management node 205, 209 comprises a receiving unit 801 which is configured to receive a message comprising a trigger to move the at least one user equipment bearer resource from the source serving gateway 207a to the at least one target serving gateway 207b. Further, the mobility management node 205, 209 comprises a selecting unit 802 configured to select the at least one target serving gateway 207b, and a sending unit 803 configured to send a message to the selected target serving gateway 207b requesting relocation of the at least one user equipment bearer resource to the at least one target serving gateway 207b. The mobility management node 205, 209 also comprises a relocating unit 804 which is configured to relocate the at least one user equipment bearer resource from the source serving gateway 207a to the at least one selected target serving gateway 207b.

The present mechanism for enabling relocation of a user equipment 203 from the source serving gateway 207a to at least one target serving gateway 207b in a communication network 200 may be implemented through one or more processors, such as a processing unit 603 in the source serving gateway 207a depicted in FIG. 6 and a processing unit 805 in the mobility management node 205, 209 depicted in FIG. 8, together with computer program code for performing the functions of the present solution. The processing unit may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the source serving gateway 207a and/or mobility management node 205, 209. One such carrier may be in the form of a CD ROM disc. It is however feasible with other data carriers such as a memory stick. The computer program code can furthermore be provided as pure program code on a server and downloaded to the source serving gateway 207a and/or mobility management node 205, 209 remotely using a communication network 200.

The present solution is not limited to the above described preferred embodiments. Various alternatives, modifications and equivalents may be used. Therefore, the above embodiments should not be taken as limiting the scope of the solution, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

The invention claimed is:

1. A method in a source serving gateway (SGW) for triggering relocation of at least one user equipment (UE) bearer resource from the source SGW to at least one target SGW in a communication network, the source SGW serving a UE by providing bearer resources to the UE, the method comprising:
    detecting, by the source SGW, an overload of the source SGW; and
    in response to the detected overload of the source SGW, initiating, by the source SGW, a relocation of the at least one UE bearer resource from the source SGW to the at least one target SGW, wherein said initiating comprises:
    sending, by the source SGW and as part of the relocation initiated by the source SGW, a message to a mobility management node, the message comprising both i) a trigger to relocate the at least one UE bearer resource from the source SGW to the at least one target SGW and ii) a capacity value, wherein the capacity value indicates a request for a total stop of incoming signalling.

2. The method of claim 1, further comprising:
    triggering an overload protection function at the source SGW based on the detected overload.

3. The method of claim 1, wherein said message to the mobility management node identifies a specific subscriber for relocation.

4. The method according to claim 1, further comprising:
    receiving, by the source SGW, a request from the mobility management node, the request comprising instructions to free the at least one user equipment bearer resource between the source serving gateway and the user equipment;
    freeing, by the source SGW, the at least one bearer resource between the source serving gateway and the user equipment; and sending, by the source SGW, an acknowledgement to the mobility management node that the at least one bearer resource is freed.

5. The method according to claim 1, further comprising:
receiving, by the source SGW, a response from the mobility management node acknowledging the received message comprising the trigger to relocate to the at least one target serving gateway.

6. A source serving gateway (SGW) for triggering relocation of at least one user equipment (UE) bearer resource from the source SGW to at least one target SGW in a communication network, the source SGW serving a UE by providing bearer resources to the UE, the source SGW comprising:
a processor; and
a memory coupled to said processor, the memory containing instructions executable by the processor such that the source SGW is configured to:
detect an overload of the source SGW; and
in response to the detected overload of the source SGW, initiate a relocation of the at least one UE bearer resource from the source SGW to the at least one target SGW, wherein said initiating comprises:
sending, by the source SGW and as part of the relocation initiated by the source SGW, a message to a mobility management node, the message comprising both i) a trigger to relocate the at least one UE bearer resource from the source SGW to the at least one target SGW and ii) a capacity value, wherein the capacity value indicates a request for a total stop of incoming signalling.

7. The source SGW of claim 6, wherein said source SGW is further configured to trigger an overload protection function at the source SGW based on the detected overload.

8. The source SGW of claim 6, wherein said message to the mobility management node identifies a specific subscriber for relocation.

9. The source SGW of claim 6, wherein said source SGW is further configured to:
receive a request from the mobility management node, the request comprising instructions to free the at least one user equipment bearer resource between the source serving gateway and the user equipment;
free the at least one bearer resource between the source serving gateway and the user equipment; and
send an acknowledgement to the mobility management node that the at least one bearer resource is freed.

10. The source SGW of claim 6, wherein said source SGW is further configured to:
receive a response from the mobility management node acknowledging the received message comprising the trigger to relocate to the at least one target serving gateway.

* * * * *